3,459,554
PROCESS FOR RIPENING SILAGES
Shogo Hashimoto, Hyogo-ken, Japan, assignor to Kaken Kagaku Kabushiki Kaisha, Tokyo, Japan
No Drawing. Continuation-in-part of application Ser. No. 256,140, Feb. 4, 1963. This application Jan. 26, 1967, Ser. No. 611,820
Int. Cl. A23k *3/03;* C12b *1/00*
U.S. Cl. 99—8                                        4 Claims

ABSTRACT OF THE DISCLOSURE

The ripening of silage is improved by admixing with the green silage an antibiotic substance, a lactic acid bacteria culture resistant to the added antibiotic and an accelerator for the lactic acid fermentation.

---

This application is a continuation-in-part of application Ser. No. 256,140, filed Feb. 4, 1963, now abandoned.

Recently, tuberculosis, bacilli, dysenteric bacilli, and suppurative bacillic having chemical resistance have appeared because of the use of anti-microbial substances. Therefore, prevention and medical treatment for diseases by those bacilli become extremely difficult. Moreover, there is such a danger that the patients can not recover by bacilli changing condition. Thus, it causes a serious problem in the medical world, which suffers for preventing appearance of bacilli having chemical resistance. The present invention relates to a process for ripening silages by utilizing such bacteria. That is, the present invention relates to a process for ripening silages, which comprises preliminarily spreading or spraying evenly blended materials of anti-microbial substances, lactic acid bacteria having resistance against said anti-microbial substances, and a lactic acid bacteria increasing accelerator over materials for silages at the time when silages are fed in a silo, whereby partial change in quality and loss of the nutritive are reduced and excellent silages are ripened. Generally speaking, most parts of cost in live-stock breeding are costs for feed, and therefore it is necessary to save expenses for feed. A key to have expenses for feed is that rough feed, which is a basic feed for ruminants, is secured well to reduce the amount of rich feed as much as possible. As rough feed, live grasses or silages or dried grasses for storage are employed. However, the season of live grasses is limited and the dried grasses requires comparatively much labour. Moreover, when heat is used for producing dried grasses cost becomes high and loss of the nutritive is much. Accordingly, it may be the wisest way to employ much silages. Silages may be maintained in the condition of the live grass throughout the year, and as feed a small part is thrown away and most parts can be used. Moreover, loss of the nutritive during storage is comparatively little, and domestic animals, particularly milking cows like silages. Accordingly, as can be understood, 10%–20% (more per centages if silages of good quality are employed), based on the total amount of feed, of silages may be employed as feed for general domestic animals except very young animals, even though there is a little difference according to the kinds of domestic animals. Therefore, it is considered that silages have the greatest part to save expenses for feed.

The quality of silages depends on fermentation of lactic acid. If fermentation of lactic acid is well carried out, the whole silages in the silo have good quality, and if not the whole silages have bad quality. Therefore, the result of ripening is insecure and uncertain. According to statistics, when ripening is not satisfactorily carried out, bad silages in the silo are 30 percent. As will be understood from the judgment in a silage show, merely 60% of silages is judged to be good and 20% is judged to be silages having bad quality. The fact is very important. Partial change in quality occurs in the portion between the surface of silages and the inner wall of the silo by influence of undesirable microorganisms and the loss is 3 to 5%, based on the whole amount of the contents. In case of trench silages which are ripened by covering directly a vinyl cover, silages are more easily polluted by bacteria in the soil, and therefore loss of partial change in quality becomes greater. Furthermore, the temperature of silages becomes considerably high due to rampancy of high temperature bacteria, whereby loss of the nutritive increases. It takes about 30 days to 40 days in general unit silages are stabilized since their feeding. The sooner silages are ripened and stabilized by effecting fermentation of lactic acid well, the smaller is the loss of the nutritive. If fermentation of lactic acid is badly carried out, it will take much time to ripen silages, and the longer is the period till stabilization, the more becomes the loss of the nutritive.

A factor of deciding the degree of loss resides in whether materials and a process of feeding are good or not. However, it is a more important factor whether microorganisms concerned with ripening silages, such as lactic acid bacteria, butyric acid bacteria, acetic acid bacteria and the like act well or not. Lactic acid bacteria are principal motive power for ripening silages. Butyric acid bacteria (spore-forming anaerobes having heat resistance and containing *Clostridium butyricum,* which will be called merely butyric acid bacteria henceforth) make quantity of silages wrong and in some case cause loss of all silages.

The necessary amount of silages is unexpectedly much. Therefore, if ripening ratio of silages having good quality is increased and that of silages of bad quality is decreased by treating said microorganisms, thereby to make loss by partial change in quality little and, moreover, if loss of the nutritive is reduced, great advantages will be attained. Till now, studies on the process for ripening silages and many experiments therefor have been carried out and several kinds of addition agents have been invented. However, their effects are not sufficient, so that none of them are broadly utilized. For example, acid, molasses, and sodium metabisulfite are used to some extent. Acid can be used merely for storage, but if too small or too much amount of acid is used, no effect can be attained and, besides it, it is dangerous. Therefore, it is very troublesome for farmers to use acid. Molasses is employed for the purpose of supplying carbohydrate and it is effective for carrying out fermentation of lactic acid a little better than in the case of naturally ripening, but it is very difficult to use rapidly. Sodium metabisulfite is used for the purpose of making soon silages fed in anaerobic condition by reduction reaction of sulfurous acid gas. However, materials shall be cut to small pieces and pressed in vacuo. As sulfurous acid gas is injurious, farmers must take care of the changing flow of air many times or wear a mask when they work for ensiling. Moreover, after feeding in a silo is completed, treading on is required every day for a good while, and implements shall be washed with water and dried after their use to prevent rusting. As mentioned above, the handling is very troublesome. A process for controlling microorganisms which change silages badly by adding zinc bacitracin, a kind of antimicrobial substances, when silages are fed in a silo, as described in the specification of U.S. Patent No. 2,940,857, is known. However, not only harmful microorganisms but also increase of useful lactic acid bacteria is inhibited at the same time, and therefore good effect can not be attained. (In the following examples, the effect of the process is compared with that of the process of the present invention.)

According to the present invention, a blended material of antibiotics, lactic acid bacterial having resistance against said anti-microbial substances which causes promptly fermentation of lactic acid at a low temperature and forms lactic acid, and an accelerator for increasing lactic acid bacteria is sprayed or spread equally over the raw materials when the materials are fed in a silo. By the activity of the anti-microbial substances all of bacteria attaching to the raw materials and the inner wall of the silo, i.e. lactic acid bacteria, butyric acid bacteria and others, are controlled and reduced at the same time. Then, merely lactic acid bacteria having resistance against said anti-microbial substances and maintaining activity without controlling and reducing by the activity of said anti-microbial substances, which are most suitable for ripening good silages, increase promptly in the culture medium comprising a liquid oozing out from the raw materials and a lactic acid bacteria increasing accelerator, cause rapidly fermentation of lactic acid at a low temperature and form much amount of lactic acid. By adjusting the pH value to about 4, generation and increase of butyric acid bacteria are restricted. Thus, quite excellent fragrant silages in which ammonia, butyric acid, acetic acid and amines, the product of those bacteria, are absent of present in a quite small amount are certainly ripened. Furthermore, partial change in quality is small, and as lactic acid fermentation is completed at a low temperature in a short time and silages are prapidly stabilized, loss of the nutritive may be extremely decreased. As will be understood from the above explanation, two difficult problems in a process for ripening silages, i.e. one being prevention of propagation of various bacteria and the other being sufficient fermentation of lactic acid, can be solved at one time by using lactic acid bacteria having resistance against anti-microbial substances added in the process of the present invention.

When the present invention is carried out, the following points shall be paid attention to.

(1) As anti-microbial substances, streptomycin, aureomycin, nitrofuran, sulfur drugs and the like which are soluble and have little toxicity may be used. The amount of the anti-microbial substances is 3 to 5 p.p.m. based on the quantity of the raw material.

(2) As lactic acid bacteria having resistance against said anti-microbial substances, any of lactic acid bacteria which cause lactic acid fermentation soon at a low temperature to form much amount of lactic acid may be employed. However, in the process of the present invention lactic acid bacteria formed by the following method are principally used.

(a) Lactic acid bacteria separated from silages having good quality, dairy products or the natural world are cultivated over many generation in a medium containing anti-microbial substances, thereby to give lactic acid bacteria resistance against said anti-microbial substances in vitro.

(b) Lactic acid bacteria separated from silages having good quality, diary products or the natural world are collected and cultivated over many generations. Then, the culture medium is added into feed of domestic animals. While, anti-microbial substances to be added are given to the same domestic animals, the amount of said anti-microbial substances being increased gradually. Lactic acid bacteria are cultivated in the digestive organs of the domestic animals, and resistance against said anti-microbial substances is given to the lactic acid bacteria in vivo. Then, thus prepared lactic acid bacteria are separated and recovered from excrements of the organisms or the content of the digestive organs.

(c) Lactic acid bacteria, which could obtain resistance against anti-microbial substances added into the raw materials before or during feeding silages in a silo by means of activity of said anti-microbial substances, are separated and collected.

(d) Lactic acid bacteria originally having resistance against anti-microbial substances to be added are separated and collected from silages having good quality or dairy products, or from the natural world.

A more detailed explanation preparing the resistant lactic acid bacteria is given below.

Lactic acid bacteria participating in the fermentation of silage are collected and cultivated in a culture medium added with an antibiotic. The concentration of the antibiotic is started from 1–2 p.p.m. and then becomes higher while cultivating over many generations and finally reaches 500 p.p.m. The degree of resistance obtained varies with the kind of strain. A strain which can be propagated in the concentration of 500 p.p.m. is cultivated over about 20 generations at that concentration, by which the stable, resistant lactic acid bacteria can be obtained.

Composition of the culture medium

| | |
|---|---|
| Tripton (Difco) _____g__ | 10 |
| Beef extract powder _____g__ | 10 |
| Yeast extract (Difco) _____g__ | 5 |
| Glucose _____g__ | 20 |
| Tween 80 _____ml__ | 1 |
| $K_2HPO_4$ _____g__ | 2 |
| $CH_3COONa \cdot 3H_2O$ _____g__ | 5 |
| $(NH_4)_2HC_6H_5O_7$ _____g__ | 2 |
| $MnSO_4 \cdot 4H_2O$ _____mg__ | 50 |
| $MgSO_4 \cdot 7H_2O$ _____mg__ | 200 |
| Bacitracin _____p.p.m__ | 1–500 |
| Distilled water _____ml__ | 1,000 |

DEGREE OF RESISTANCE TO BACITRACIN

| Strain | Generations | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Streptococcus | 40 | 80 | 120 | 200 | 400 | 500 | | | | | | | | | | |
| Levconostoc | 2 | 2 | 4 | 8 | 10 | 15 | 25 | 50 | 100 | 120 | 180 | 230 | 280 | 330 | 420 | 550 |
| Pediococcus | 40 | 60 | 100 | 100 | 150 | 200 | 350 | 600 | | | | | | | | |
| Lactobacillus AL | 40 | 40 | 60 | 100 | 240 | 350 | 600 | | | | | | | | | |
| Lactobacillus BL | 20 | 30 | 60 | 70 | 100 | 150 | 200 | 350 | 500 | | | | | | | |

Differently from ordinary lactic acid bacteria, the resistant lactic acid bacteria thus obtained grow even in the presence of an antibiotic against which they have resistance.

The use of such resistance lactic acid bacteria together with an antibiotic brings a remarkable result. This is the essential point of the present invention, which should be beyond an improvement in the preparation of silage.

(3) As for the degree of resistance against anti-microbial substances to be added, 1000$\gamma$ is desirable for streptomycin. In case of other anti-microbial substances, such as aureomycin, sulfur agents, 50 to 500$\gamma$ is suitable.

(4) As lactic acid bacteria, one kind of bacteria may be used. However, more suitably, several kinds of lactic acid bacteria having activity, of which the most suitable temperatures and pH values are different, are selected from the kinds present much in lactic acid bacteria collected separately from silages during fermentation of lactic acid, i.e. in the early stage of fermentation, in the stage where increase of lactic acid is most violent, and in the stage where silages are stabilized. Those kinds of lactic acid bacteria belong to, for example, Streptococcus, Pediococcus, Leuconostoc, Lactobacillus. Then, they are properly combined, and used.

As bacteria belonging to *Streptococcus S. lactics, S. faecalis, S. liquefaciens* and others, as bacteria belonging to *Pediococcus P. cerevisiae* and others, as bacteria belonging to *Leuconostoc L. mesenteroides* and other and as bacteria belonging to *Lactobacillus L. plantarum, L. casei, L. brevis, L. buchneri* and others may be used in the process of the present invention.

(5) The amount of lactic acid bacteria having resistance against said anti-microbial substances is 1 to 5 billions per ton of the raw materials. However, the required amount is more in the cold regions than in warm regions. In case of the raw materials having bad quality, more amount is necessary than in case of the raw materials having good quality.

(6) As accelerators of increasing lactic acid bacteria, sugars, whey, powdered skim milk, chlorela, and yeast extract which take immediate effect may be used suitably.

(7) When a compounding agent is employed, the compounding agent is placed in a sprinkler in form of powder in the case where the water content of the raw materials is much, or in a sprayer in form of a solution suitably dissolved with water in the case where the water content is small. Then, the compounding agent is sprinkled or sprayed over the raw materials at the time when the raw materials are fed in a silo. When the raw materials are placed in a cutter or a grinder, it may be added. Any of said three addition agents may be added singly at the time when the raw materials are placed in a cutter or a grinder and at the time when they are fed in a silo.

(8) In the process of the present invention, (a) other bacteria having resistance and yeasts and enzymes as ripening-supporting agents, (b) accelerators of an anaerobiosis, (c) mould preventing agents (if necessary, resistance against mould preventing agents is given to lactic acid bacteria having resistance against anti-microbial substances) and the like may be used together.

(9) Silages excellent to some extent may be ripened by adding merely anti-microbial substances and lactic acid bacteria having resistance against said anti-microbial substances.

EXAMPLE (1) Prescription of addition agents (per ton of the raw materials)

(a) As an anti-microbial substance, 5 p.p.m. of streptomycin is employed.

(b) As lactic acid bacteria having resistance against said anti-microbial substance, one billion of *St. lactis* (the suitable temperature is 10° C.; 1% of lactic acid is formed at a temperature ranging from 10° C. to 38° C.) having 1,000$\gamma$/cc. of resistance against streptomycin and one billion of *L. plantarum* (the suitable temperature is 25° C.; 1.3–1.5% of lactic acid is produced at a temperature ranging from 10° C. to 40° C.) are used.

(c) As general lactic acid bacteria, the same amount of the above-mentioned two kinds of lactic acid bacteria, which have no resistance, is used.

(d) As an accelerator of increasing lactic acid bacteria, 200 g. of powdered skim milk is used.

(2) Siloes for the tests, raw materials and a process for feeding materials

As test siloes, six specimen bottles having 12 cm. in diameter and 39 cm. in depth are well washed with water and dried. As the raw materials, Chinese milkvetches are picked immediately before they are in full bloom, exposed slightly to the sun, cut to fine pieces and stirred. Thereafter, the prepared raw materials are fed in each of siloes with pressing, in such a way as the top of a thermometer in form of a rod is placed in the center of silages. The scale rod of the thermometer is thrust out of the silo through the center of the cap so that the temperature of the silo can be observed. The whole contents are strongly pressed and the bottle is closed by the cap. Then, each of the bottle is placed in a cold place in a storehouse. The temperature of the outside world is 20° C. to 22° C., and the temperature in the storehouse is 18° C.

(3) Contents of addition agents in test siloes

No. 1 silo is employed for comparison with others. No addition agent is added.

In No. 2 silo, merely lactic acid bacteria having no resistance are added.

In No. 3 silo, merely an anti-microbial substance is added.

In No. 4 silo, an anti-microbial substance and an accelerator of increase of lactic acid bacteria are added.

In No. 5 silo, an anti-microbial substance, lactic acid bacteria having no resistance and an accelerator of increasing lactic acid bacteria are added.

In No. 6 silo, an anti-microbial substance, lactic acid bacteria having resistance against the anti-microbial substance and an accelerator of increasing lactic acid bacteria, which are employed in the process of the present invention, are added.

(4) RESULTS

| Silo Number | No. 1 Comparison | No. 2 Lactic bacteria acid alone | No. 3 An anti-microbial substance alone | No. 4 An anti-microbial substance and accelerator of increasing lactic acid bacteria | No. 5 An anti-microbial substance, lactic acid bacteria and an accelerator of increasing lactic acid bacteria | No. 6 An anti-microbial substance, lactic acid bacteria having resistance and an accelerator of increasing lactic acid bacteria |
|---|---|---|---|---|---|---|
| Tests up to stabilization: | | | | | | |
| Days until the highest temperature appears during fermentation | 4 | 3.5 | 3 | 3 | 2.5 | 2 |
| The highest temperature, ° C | 36 | 33 | 30 | 29 | 27 | 24 |
| Days required until silages are stabilized | 31 | 30 | 29 | 28 | 25 | 22 |
| Test after stabilization: | | | | | | |
| pH | 4.3 | 4.2 | 4.7 | 4.6 | 4.4 | 3.9 |
| Dried materials, percent | 20 | 19 | 20 | 20 | 19 | 19 |
| Partial loss,[1] percent | 7 | 5 | 3 | 2 | 2 | 1 |
| NH$_4$–N,[2] percent | 3.0 | 2.5 | 1.6 | 1.3 | 1.0 | 0.5 |
| Lactic acid,[2] percent | 7 | 8 | 2 | 3 | 7 | 13 |
| Butyric acid,[2] percent | 1 | 0.8 | 0.5 | 0.3 | 0.2 | 0 |
| Acetic acid,[2] percent | 3.0 | 2.2 | 1.8 | 1.8 | 1.8 | 0.5 |
| Propionic acid, formic acid, succinic acid and others,[2] percent | 1.6 | 1.5 | 1.2 | 1.2 | 1.1 | 0.8 |
| Whole organic acids,[2] percent | 12.6 | 12.5 | 5.5 | 6.3 | 10.1 | 14.3 |
| All anaerobic bacteria [3] | 200,000 | 250,000 | 3,000 | 8,000 | 26,000 | 350,000 |
| Lactic acid bacteria [3] | 120,000 | 260,000 | 2,000 | 5,000 | 15,000 | 345,000 |
| Butyric acid bacteria [3] | 1,000 | 500 | <1 | <1 | <1 | 0 |

[1] Percent, based on the total amount of the silages.
[2] Percent, based on the amount of solid materials.
[3] Number of bacteria in 10 g. of the silages; the unit is 1000.

(5) As will be clearly understood from the above table showing the results of tests with regard to six kinds of silages, silages ripened in No. 6 silo according to the process of the present invention cause soonest fermentation of lactic acid and are stabilized most rapidly, of which highest temperature is the lowest of all. Accordingly, (a) loss of the nutritive in the process of ripening is slightest, (b) partial change in quality is smallest, and (c) the pH value is most desirable and the content of undesirable substances, such as ammoniacal nitrogen butyric acid and the like is smallest. It will be presumed from the above table that quality of silages produced according to the process of the present invention is best and silages having good quality are certainly ripened.

(6) The above table representing the results of the tests is applied to the standard of deciding the grade of quality of silages (Draft) described on page 131 of "Processes for the Preparation of Silages and Methods of Utilization Thereof" by Mr. Sudo, a professor of the Agricultural Department of Okayama University in the following. All of No. 3, No. 4 and No. 5 silages are affected by an antimicrobial substance and fermentation of lactic acid is not carried out well. Therefore, their points and grades are not good. On the contrary, the silages produced according to the process of the present invention can attain the most points and the highest grade.

What I claim is:

1. In the process of preparing silage, the improvement which comprises admixing with the raw silage material (a) an antibiotic substance, (b) a culture of lactic acid bacteria cultivated and collected from a medium containing said antibiotic which bacteria are thus rendered resistant to said antibiotic substances, and (c) an accelerator selected from the group consisting of sugars, whey, skim milk, chlorela, and yeast extract for increasing the activity of said bacteria.

2. The process according to claim 1 in which the culture of lactic acid bacteria includes at least one strain of lactic acid bacteria obtained from silage and cultivated in a medium containing an antibiotic substance over about 20 generations.

3. The process according to claim 1 wherein the resistant lactic acid bacteria are selected from the group consisting of genus Lactobacillus, Pediococcus, Leuconostoc and Streptococcus.

4. A process according to claim 1, wherein the antibiotic substance is selected from the group consisting of streptomycin and aureomycin.

| Silo Number | No. 1 | No. 2 | No. 3 | No. 4 | No. 5 | No. 6 |
|---|---|---|---|---|---|---|
| Contents of addition agents | Comparison | Merely lactic acid bacteria | Merely an antimicrobial substance | An antimicrobial substance, and an accelerator of increasing lactic acid bacteria | An antimicrobial substance, lactic acid bacteria and an accelerator of increasing bacteria | An antimicrobial substance, lactic acid bacteria having resistance and an accelerator of increasing lactic acid bacteria |
| pH, points | 40 | 55 | 3 | 13 | 30 | 60 |
| Smell, points | 7 | 8 | 5 | 5 | 6 | 10 |
| Taste, points | 7 | 8 | 4 | 5 | 6 | 10 |
| Color, points | 6 | 7 | 5 | 5 | 6 | 10 |
| Feel, points | 8 | 9 | 8 | 8 | 8 | 10 |
| Points | 68 | 87 | 25 | 26 | 36 | 100 |
| Grade | Good | Excellent | Inferior | Bad | Good | Supreme |

References Cited

UNITED STATES PATENTS

| | | | |
|---|---|---|---|
| 1,807,043 | 5/1931 | Mabee | 99—9 |
| 2,299,745 | 10/1942 | Hansen | 99—9 |
| 2,940,857 | 6/1960 | Andrews | 99—8 |
| 3,147,121 | 9/1964 | Brown | 99—9 |
| 3,172,764 | 3/1965 | Biehl | 99—8 |
| 3,202,587 | 8/1965 | Karklign et al. | 195—36 |

FOREIGN PATENTS 865,796  4/1961  England.

OTHER REFERENCES

Pederson, Bacteriological Previews, pp. 225–231, vol. 13, 1949.

Day, Agricultural and Food Chemistry, vol. 2, No. 5, pp. 252–258, Mar. 3, 1954.

LIONEL M. SHAPIRO, Primary Examiner

NORMAN ROSKIN, Assistant Examiner

U.S. Cl. X.R.

99—9; 195—112, 114